US010382222B2

(12) United States Patent
Beckmann et al.

(10) Patent No.: US 10,382,222 B2
(45) Date of Patent: Aug. 13, 2019

(54) METHOD FOR PROTECTING CONFIGURATION DATA FROM A DATA BUS TRANSCEIVER, DATA BUS TRANSCEIVER AND DATA BUS SYSTEM

(71) Applicants: Continental Teves AG & Co. oHG, Frankfurt (DE); NXP USA Inc., Austin, TX (US)

(72) Inventors: Tobias Beckmann, Eschborn (DE); Ireneusz Janiszewski, Mühltal (DE); Frank Michel, Rosbach v. d. Hoehe (DE); Claas Cornelius, Hannover (DE); Robert Gach, Seysses (FR)

(73) Assignees: Continental Teves AG & Co. oHG, Frankfurt (DE); NXP USA Inc., Austin, TX (US)

( * ) Notice: Subject to any disclaimer, the term of this patent is extended or adjusted under 35 U.S.C. 154(b) by 0 days.

(21) Appl. No.: 15/565,606

(22) PCT Filed: Apr. 30, 2015

(86) PCT No.: PCT/EP2015/059610
§ 371 (c)(1),
(2) Date: Oct. 10, 2017

(87) PCT Pub. No.: WO2016/173678
PCT Pub. Date: Nov. 3, 2016

(65) Prior Publication Data
US 2018/0309590 A1  Oct. 25, 2018

(51) Int. Cl.
*H04L 12/40* (2006.01)
*H04L 12/12* (2006.01)
*H04B 1/38* (2015.01)

(52) U.S. Cl.
CPC ......... *H04L 12/40039* (2013.01); *H04B 1/38* (2013.01); *H04L 12/12* (2013.01); *H04L 2012/40215* (2013.01); *Y02D 50/40* (2018.01)

(58) Field of Classification Search
None
See application file for complete search history.

(56) References Cited

U.S. PATENT DOCUMENTS

| 6,415,406 | B1 | 7/2002 | Kaiser et al. |
| 7,225,391 | B1 * | 5/2007 | Bain ................. G06F 11/1004 714/752 |

(Continued)

FOREIGN PATENT DOCUMENTS

| DE | 19835258 A1 | 2/2000 |
| DE | 102011081452 B3 | 2/2013 |
| EP | 1493460 A1 | 1/2005 |

OTHER PUBLICATIONS

International Search Report and Written Opinion for International Application No. PCT/EP2015/059610, dated Jan. 28, 2016, 8 pages.

*Primary Examiner* — Bunjob Jaroenchonwanit
(74) *Attorney, Agent, or Firm* — RatnerPrestia

(57) ABSTRACT

A method for protecting configuration data from a data bus transceiver operable in a subnetwork mode. The configuration data are provided for comparison with data bus message data arriving via a data bus. A reference checksum for the configuration data is generated and stored, and recurrently checked. In the event of an identified alteration, a wake-up signal and/or a piece of error information is output. During or after writing the configuration data to a configuration register via the data bus or directly before the change to the low-power mode of the electronic control unit, a checksum unit forms a checksum that is stored in a reference register. In the low-power mode of the electronic control unit, the checksum for the configuration is repeatedly recomputed (Continued)

and compared with the checksum stored in the reference register. If the recomputed checksum does not match the stored checksum, a wake-up process is triggered.

17 Claims, 1 Drawing Sheet

(56) References Cited

U.S. PATENT DOCUMENTS

| | | | |
|---|---|---|---|
| 9,276,822 B2 | 3/2016 | Messner | |
| 2002/0183119 A1* | 12/2002 | Fessler | A63F 13/02 463/47 |
| 2004/0003316 A1* | 1/2004 | Meng | G06F 11/1076 714/13 |
| 2008/0155372 A1* | 6/2008 | Kravitz | H03M 13/1105 714/752 |
| 2009/0183058 A1* | 7/2009 | Condorelli | G06F 11/1608 714/807 |
| 2009/0313533 A1* | 12/2009 | Bains | G06F 11/1004 714/807 |
| 2012/0317134 A1* | 12/2012 | Bourbonnais | G06F 17/30371 707/769 |
| 2016/0009080 A1* | 1/2016 | Akune | B41J 2/04573 347/10 |
| 2017/0149518 A1* | 5/2017 | Hartlmueller | H04L 12/40032 |

\* cited by examiner

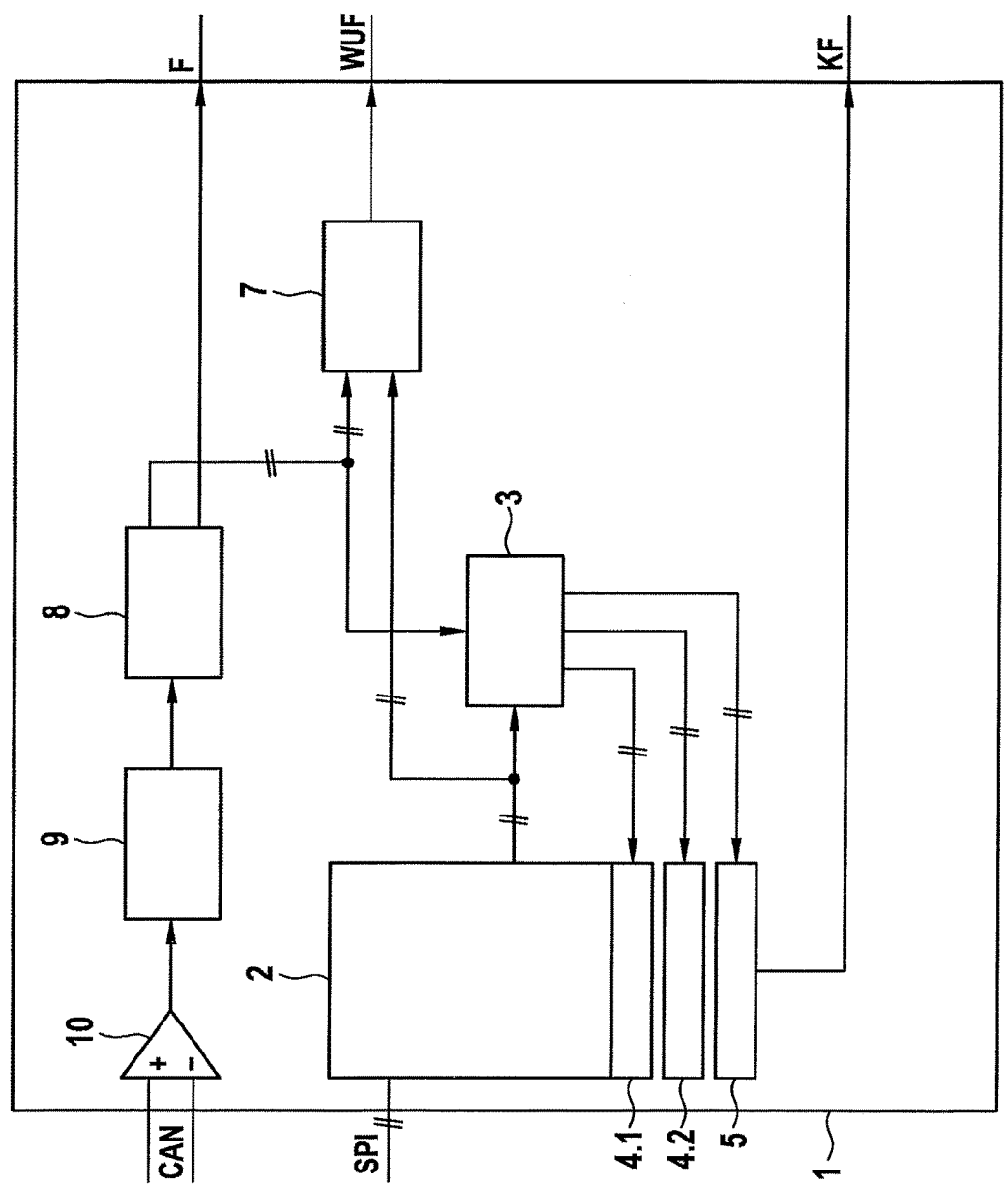

METHOD FOR PROTECTING CONFIGURATION DATA FROM A DATA BUS TRANSCEIVER, DATA BUS TRANSCEIVER AND DATA BUS SYSTEM

CROSS REFERENCE TO RELATED APPLICATIONS

This application is the U.S. National Phase Application of PCT International Application No. PCT/EP2015/059610, filed Apr. 30, 2015, the contents of such application being incorporated by reference herein.

FIELD OF THE INVENTION

The present invention relates to a method for protecting configuration data of a data bus transceiver, a data bus transceiver, and a corresponding data bus system for a motor vehicle.

BACKGROUND OF THE INVENTION

Data bus systems are used in a variety of technical fields. Examples include automobile and aircraft technology, wherein in particular the communication of electronic control units (ECU) is achieved using bus systems, for example, CAN (controller area network) bus.

Data bus transceivers which are able to function in partial networking (PN) comprise a decoder via which the arriving bus messages can be read and decoded in the low-power mode. For implementing the partial networking, these transceivers must be configured after applying a voltage. The configuration may comprise, for example, the identifier (ID) which identifies the content of a message, an identifier mask (IDM), a piece of information about the number of bytes in data (DLC), the data field including a check field (for example, CRC field), and other configuration bits; and defines incoming messages provided for triggering the wake-up procedure. In the low-power mode, these data remain stored as long as the supply voltage is applied (for example, via KL30B). The data bus transceiver reads the messages on the bus in the low-power mode and compares them to the stored configuration. After correct decoding, for example, in the case of CAN, the ID, IDM, and DLC data bits, as well as the CRC of the incoming CAN message, are compared to the configured data. In the case of a match (for example, according to ISO11898-6), a wake-up procedure is executed, via which the electronic control unit associated with the transceiver is put into the normal operating state. If the CAN messages are not correctly decoded, but rather are erroneous due to disturbances and/or manipulation on the bus, or due to the faulty decoder, for example, in the case of a detuned clock generator of the transceiver, an error counter is incremented. If a limit is reached, a wake-up procedure is similarly executed.

Due to external or internal disturbances, for example, alpha decay, electromagnetic interference, or degradation of the memory cells, it may occur that the configuration is changed. The probability of the occurrence of an error increases with increasing duration of the low-power state. While the data could be read out and reconfigured during normal operation, a check in the low-power mode is often not possible due to power-saving measures. Thus, the electronic control unit either cannot be woken, although a data frame has been entered which is intended for waking up, or said electronic control unit is erroneously woken via a data frame which is not provided for this purpose. In addition, it may occur that waking up the relevant electronic control unit via the bus is no longer possible at all, because the erroneous configuration no longer matches any message configuration used in the system. Depending on the relevant system with which the electronic control unit or bus user is associated, under some circumstances, the availability of a relevant system may be reduced and/or safety-critical situations may be triggered. These faults are problematic since they are not signaled.

SUMMARY OF THE INVENTION

An aspect of the present invention aims to provide a means via which improved availability of bus users, for example, electronic control units which communicate by means of the data bus, is made possible. Furthermore, the implementation is to require as few modifications as possible.

An aspect of the present invention describes a method for protecting configuration data of a data bus transceiver which is operable in partial networking, wherein the configuration data are provided for comparison with data of data bus messages incoming via a data bus, said method being characterized in that a reference checksum of the configuration data is generated and stored, wherein this reference checksum is checked recursively, and in the case of a detected change, a wake-up signal and/or a piece of error information is output.

Thus, improved availability of bus users of a data bus is advantageously made possible, in that, for example, changes in configuration data caused by external and/or internal disturbances may be detected, whereby the risk that the relevant bus user can no longer be woken via the bus is reduced. The erroneous wake-up via bus messages which are not intended for this purpose, following a change in configuration data which correspond to an existing data frame configuration, may be detected immediately and handled. The output of the wake-up signal also enables further error handling, wherein the output error information may also be included in the wake-up signal. The modifications to existing systems which are necessary for implementing aspects of the present invention may be considered to be comparatively minor. Safety-critical situations may be advantageously reduced via the present invention, and the system availability may be increased.

According to one preferred embodiment of the present invention, for checking the stored reference checksum and/or configuration data, a checksum of the configuration data is regenerated and compared to the stored checksum. The regeneration of a checksum of the configuration data preferably takes place recursively. It is thus possible to carry out a repeated check of the configuration data or the stored checksum even over a longer period, whereby in particular errors may be handled, the probability of which increases with the length of the period.

Particularly preferably, the regeneration of a checksum of the configuration data is triggered, in particular cyclically, via an incoming data bus message and/or according to temporal specifications.

Advantageously, the wake-up signal and/or the piece of error information are output to at least one electronic control unit which is associated with the data bus transceiver. This improves subsequent error handling via the associated electronic control unit. Necessary measures, for example, communicating the error to a passenger in a motor vehicle and/or correcting the error automatically, may be taken.

According to one advantageous refinement of the present invention, the check of the reference checksum takes place in a low-power mode of the data bus transceiver and/or an electronic control unit which is associated with the data bus transceiver. Advantageously, the probability is thus decreased that, despite power-saving measures in the low-power mode, it is no longer possible to wake the relevant electronic control unit via the data bus.

The reference checksum is preferably generated during or after storage of the configuration data or directly before transition to a low-power mode of the data bus transceiver or an electronic control unit which is associated with the data bus transceiver. A probability of changes following internal and/or external disturbances in a period between the storage of the checksum and the transition to a low-power mode is thus kept as low as possible, since the period up to the start of the check in the low-power mode is comparatively short, which is advantageous particularly in the case of carrying out the check only in the low-power mode. Writing or storing the configuration data advantageously takes place by means of a data bus, for example, a serial data bus, in particular a serial peripheral interface.

Furthermore, an aspect of the present invention relates to a data bus transceiver comprising storage means for storing configuration data which are provided for comparison with data of data bus messages incoming via a data bus, wherein the data bus transceiver is designed in such a way that, by means of a checksum device, a reference checksum of the configuration data may be generated and may be stored in a storage means for storing the reference checksum, in order to recursively check this reference checksum in at least one operating state of the data bus transceiver, and in the case of a detected change, to output a wake-up signal and/or a piece of error information.

The data bus transceiver according to an aspect of the present invention is preferably designed in such a way that for checking the stored reference checksum and/or configuration data, at least one renewed checksum of the configuration data may be generated by means of a checksum device and may be compared to the stored reference checksum by means of a comparison unit.

According to one refinement, the data bus transceiver has a low-power mode with at least two operating states having different power consumption, wherein the check of the reference checksum may be carried out in one of these operating states. This enables additional gradation with respect to the power consumption of the data bus transceiver within the scope the low-power mode.

The data bus transceiver according to an aspect of the present invention is preferably designed in such a way that the method according to the present invention may be carried out.

A data bus system for a motor vehicle, comprising a plurality of data bus users and at least one data bus for exchanging data bus messages between the data bus users, wherein the data bus system comprises at least one data bus transceiver according to an aspect of the present invention.

BRIEF DESCRIPTION OF THE DRAWINGS

Additional preferred embodiments result from the following description of an exemplary embodiment based on FIG. 1.

The following is shown in a schematic diagram:

FIG. 1 shows a depiction of an embodiment of a CAN transceiver 1 according to an aspect of the present invention.

DETAILED DESCRIPTION OF THE PREFERRED EMBODIMENTS

FIG. 1 shows a schematic depiction of an exemplary embodiment of a PN-CAN transceiver 1 according to an aspect of the present invention, wherein only elements which are relevant to the description of the present invention are depicted. CAN difference signals incoming via data bus CAN are converted into a bit sequence using comparator 10, sampled 9, and decoded by means of decoder 8, in a manner known per se. The decoded CAN message is subsequently compared to data stored in configuration register 2. In the case of a match, a corresponding wake-up signal WUF is output to an associated electronic control unit. The data stored in configuration register 2 define which conditions, or which received CAN messages, cause the transceiver 1 to activate an electronic control unit which is associated with it. In the case of the detection of an error during decoding, or if a limit of an error counter is reached, a wake-up signal F indicating this error is output to the electronic control unit.

During or after the writing of the configuration data into configuration register 2 via data bus SPI, or directly before the transition to the low-power mode of the electronic control unit, a checksum is formed by means of checksum unit 3 and is stored in reference checksum register 4.1. The checksum is, for example, CRC (cyclic redundancy check) code, ECC (error-correcting code), parity, or one or more other methods for error protection. The choice of the method may in particular be made a function of how good the error detection is to be and how high the current consumption may be for execution in the low-power mode, and what the scope of the hardware and/or software resources to, be provided for this purpose may be. In the case of a CRC, for example, sequential or parallel methods may be selected. In this case, preferably, a period is considered until the sequentially calculated CRC value is valid. Checksum unit 3 and/or other functional assemblies relevant to the present invention may preferably be implemented as hardware or software, or a combination of hardware and software.

In the low-power mode of the electronic control unit, the checksum of the configuration is repeatedly recalculated and compared to the checksum stored in reference checksum register 4.1. Checksum unit 3 stores the recalculated checksum value in checksum register 4.2, whereupon comparison unit 5 carries out a comparison of the data stored in reference checksum register 4.1 with the recalculated checksum stored in reference checksum register 4.2. If the recalculated checksum does not match the stored checksum, a wake-up procedure is triggered due to a configuration error KF, by means of comparison unit 5, and a corresponding status indicator (flag) is set. The different error signals F, KF, and/or WUF may be further logically, for example, disjunctively, associated in particular within the functional scope of transceiver 1. By setting the status indicator, it is subsequently possible to determine the cause of the wake-up procedure via the associated electronic control unit. After starting, the electronic control unit has a wide variety of options for error handling; for example, the configuration may be rewritten and/or backup modes for the repeated erroneous wake-up may be activated.

The start of the check may be caused by internal and/or external triggers. For example, a temporal specification may act as an internal trigger, and incoming CAN messages may act as external triggers, since they constitute a necessary condition for the wake-up in any case. Accordingly, in FIG. 1, a signal path is provided from decoder 8 to checksum unit 3. The presence of a combination made up of at least one internal trigger and at least one external trigger is also achievable.

In the low-power mode of the electronic control unit, different power modes of transceiver 1 may be implemented, in addition to a normal operating mode, in which the transceiver 1 and/or an electronic control unit which is associated with it, or the corresponding bus user with which the electronic control unit and the transceiver and bus controller are associated, is not in a low-power mode and/or is at least partially in an activated state under normal conditions of use. For example, an operating state may be provided in which decoder 8 is switched off, as well as another operating state in which increased current consumption is permitted, wherein decoder 8 is activated and the checksum comparison is carried out.

Compare logic 7 checks if the saved values (Frame ID, Databytes . . . ) are consistent with the decoded CAN Frame, so that a wake up event can be initiated.

The invention claimed is:

1. A method for protecting configuration data of a data bus transceiver which is operable in partial networking, the method comprising:
providing the configuration data for comparison with data of data bus messages incoming via a data bus,
generating and storing a reference checksum of the configuration data wherein this reference checksum is checked recursively, and
based on a detected change, outputting a wake-up signal.

2. The method as claimed in claim 1, wherein for checking at least one of the stored reference checksum of the configuration data, a checksum of the configuration data is regenerated and compared to the stored reference checksum.

3. The method as claimed in claim 2, wherein the regeneration of a checksum of the configuration data takes place recursively.

4. The method as claimed in claim 3, wherein the regeneration of a checksum of the configuration data is cyclically via at least one of an incoming data bus or according to temporal specification.

5. The method as claimed in claim 2, wherein the regeneration of a checksum of the configuration data is cyclically triggered, via at least one of an incoming data bus message or according to temporal specifications.

6. The method as claimed in claim 1, wherein the wake-up signal is output to at least one electronic control unit which is associated with the data bus transceiver.

7. The method as claimed in claim 1, wherein the check of the reference checksum takes place in a low-power mode of at least one of the data bus transceiver or an electronic control unit which is associated with the data bus transceiver.

8. The method as claimed in claim 1, wherein the reference checksum is generated during or after storage of the configuration data or directly before transition to a low-power mode of the data bus transceiver or an electronic control unit which is associated with the data bus transceiver.

9. A data bus transceiver comprising:
a storage device for storing configuration data which are provided for comparison with data of data bus messages incoming via a data bus, wherein the data bus transceiver is designed in such a way that a reference checksum of the configuration data is generated by a checksum device and is stored in a storage register for storing the reference checksum, in order to recursively check this reference checksum in at least one operating state of the data bus transceiver, and based on a detected change, to output a wake-up signal.

10. The data bus transceiver as claimed in claim 9, wherein for checking at least one of the stored reference checksum or configuration data, at least one renewed checksum of the configuration data is generated by the checksum device and is compared to the stored reference checksum by a comparison unit.

11. The data bus transceiver as claimed in claim 10, wherein the data bus transceiver has a low-power mode with at least two operating states having different power consumption, wherein the check of the reference checksum is carried out in one of these operating states.

12. The data bus transceiver as claimed in claim 9, wherein the data bus transceiver has a low-power mode with at least two operating states having different power consumption, wherein the check of the reference checksum is carried out in one of these operating states.

13. The data bus transceiver as claimed in claim 9, wherein the data bus transceiver is designed to carry out a method for protecting configuration data of a data bus transceiver which is operable in partial networking, the method comprising:
providing the configuration data for comparison with the data of data bus messages,
generating and storing the reference checksum of the configuration data wherein the reference checksum is checked recursively, and
based on a detected change, outputting a wake-up signal.

14. A data bus system for a motor vehicle, comprising a plurality of data bus users and at least one data bus (CAN) for exchanging data bus messages between data bus users, wherein the data bus system comprises at least one data bus transceiver as claimed in claim 9.

15. A method for protecting configuration data of a data bus transceiver which is operable in partial networking, the method comprising:
providing the configuration data for comparison with data of data bus messages incoming via a data bus,
generating and storing a reference checksum of the configuration data wherein this reference checksum is checked recursively, and
based on a detected change, outputting at least one of a wake-up signal or a piece of error information.

16. A data bus transceiver comprising:
a storage device for storing configuration data which are provided for comparison with data of data bus messages incoming via a data bus, wherein the data bus transceiver is designed in such a way that a reference checksum of the configuration data is generated by a checksum device and is stored in a storage register for storing the reference checksum, in order to recursively check this reference checksum in at least one operating state of the data bus transceiver, and based on a detected change, to output at least one of a wake-up signal or a piece of error information.

17. The data bus transceiver as claimed in claim 16, wherein the data bus transceiver is designed to carry out a method for protecting configuration data of a data bus transceiver which is operable in partial networking, the method comprising:
providing the configuration data for comparison with the data of data bus messages, generating and storing the reference checksum of the configuration data wherein the reference checksum is checked recursively, and based on a detected change, outputting at least one of a wake-up signal or a piece of error information.

\* \* \* \* \*